May 8, 1951             F. P. EMERSON             2,552,413
DISPENSING UNIT FOR VENDING MACHINE HAVING A METERING
TRAP CHAMBER ROTATIVE ABOUT A VERTICAL AXIS
Filed June 11, 1946             2 Sheets-Sheet 1

Inventor
FRANK P. EMERSON
By
Attorney

Inventor
FRANK P. EMERSON
By R. S. Berry.
Attorney

100
UNITED STATES PATENT OFFICE 2,552,413

DISPENSING UNIT FOR VENDING MACHINE HAVING A METERING TRAP CHAMBER ROTATIVE ABOUT A VERTICAL AXIS

Frank P. Emerson, Los Angeles, Calif.

Application June 11, 1946, Serial No. 676,067

4 Claims. (Cl. 222—370)

This invention relates to vending machines and more particularly pertains to an improved metering and dispensing unit which is particularly designed for use in vending machines for dispensing popped corn and similar products.

One of the objects of the invention is to provide a metering and dispensing unit of the character next above described which is of simple and compact form, may be inexpensively produced and is constructed and arranged to operate in a reliable and accurate manner without sticking, clogging or other failure in dispensing exact amounts of popped corn or similar products.

Popped corn and similar bulky irregularly shaped particles must be stored in large quantity in a vending machine subject to being dispensed in metered amounts for each coin-controlled operation of the machine and heretofore much difficulty has been experienced with such machines due to the above noted characteristics of the popped corn causing the dispensing mechanism to operate erratically as to metering and in some instances to become clogged to the point of operational failure.

The present metering and dispensing unit has been designed to eliminate the objections heretofore encountered, by reason of the particular construction and relative arrangement of a hopper, a metering chamber, a discharge hood or shield, a rotary metering and dispensing member and certain parts and elements associated therewith.

Figure 1:
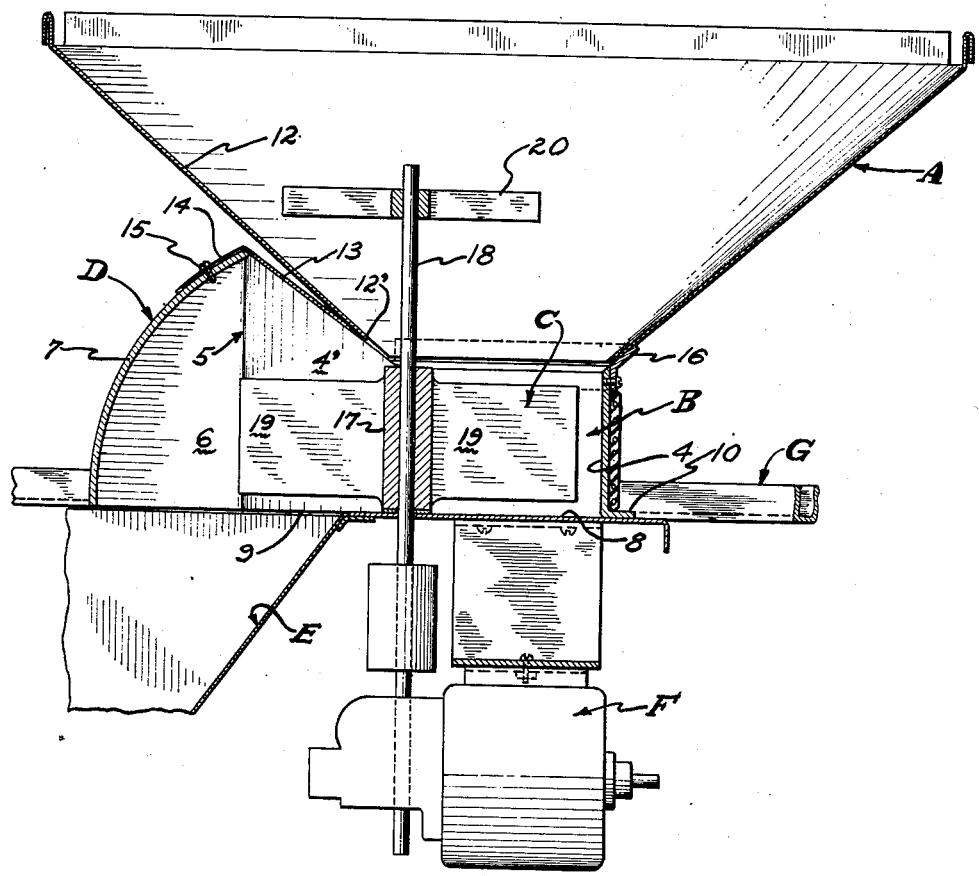
Figure 2:
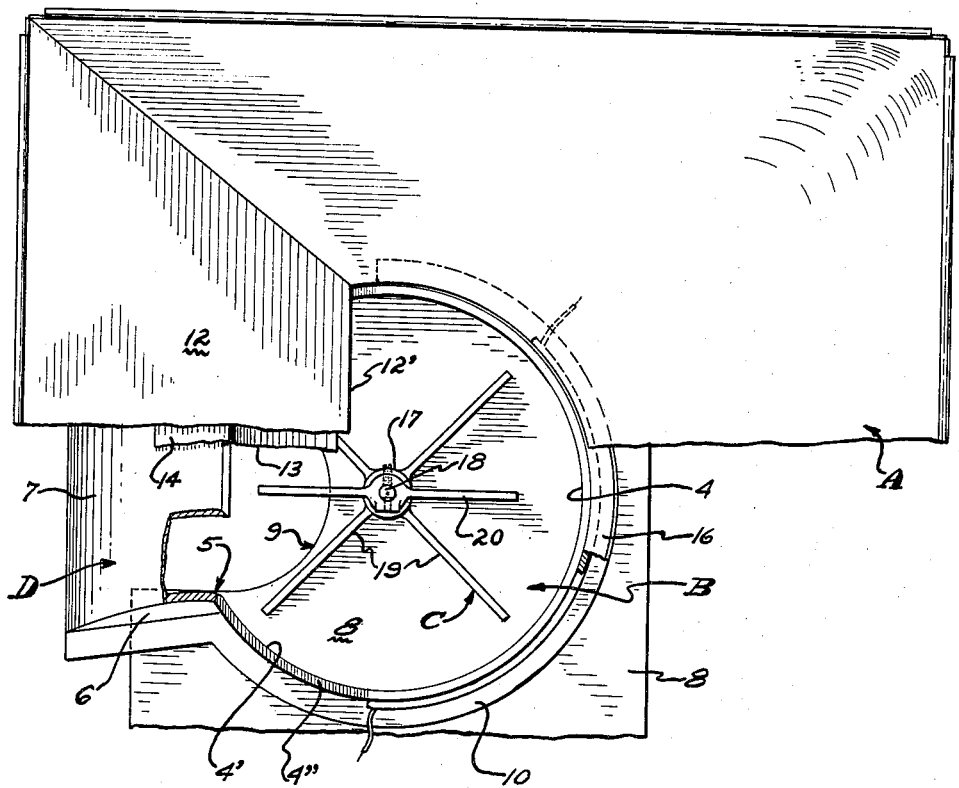
Figure 3:
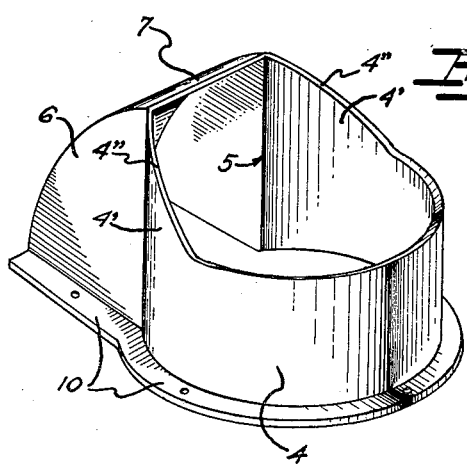

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a vertical sectional view of a metering and dispensing unit embodying the present invention, Fig. 2 is a fragmentary top plan view of the unit with parts broken away and parts shown in section for clarity of illustration, and Fig. 3 is a perspective view of the metering chamber and discharge spout casting which forms the main body of the unit. The hooded spout D while serving to confine popped corn delivered through the outlet opening 5 also encloses a space permitting separation of moving particles of the popped corn thereby preventing clogging of the discharge from the metering chamber.

The metering and dispensing unit as shown in the accompanying drawings is adapted to be mounted within the housing of a popped corn vending machine (not shown) and generally includes a popped corn hopper A, a metering chamber B into which the popped corn discharges from the hopper, a rotary metering member C in said chamber, a hooded discharge spout D through which the popped corn is directed into a delivery chute E, a motor F for operating the rotary metering member C and a frame G for supporting the unit.

The metering chamber B and hooded discharge spout D as here shown are made in the main of a single casting which generally includes a cylindrical wall 4 having a wide outlet opening 5 on one side and being of uniform height throughout the half thereof farthest removed from the opening 5. The remaining portions 4' of the cylindrical wall are sharply increased in height from the ends of the wall portion of uniform height up to margins of the outlet opening 5 and have upper edges 4" which have a steep downward slope towards the wall portion of uniform height.

The hooded spout D comprises a pair of flange-like side walls 6 formed integral with the edges of the wall portions 4' which define the sides of the opening 5, said side walls having outwardly and downwardly curved outer edges which are joined by an outwardly and downwardly curved outer wall 7 formed integral therewith and completing the hooded spout.

A plate 8 mounted on the frame G forms the bottom wall of the chamber B and is provided with a large opening 9 which registers with the opening 5. A lateral flange 10 formed on the lower edges of the walls 4 and 6 rests upon and is secured to the plate 8. The delivery chute E is fastened to the plate 8 and frame G so as to receive popped corn discharged through the openings 5 and 9. Only a part of the delivery chute is shown as the manner in which this chute opens on the front of the vending machine forms no part of this invention and is well known to those skilled in the art.

The hopper A is provided with a flat wall portion 12 which overlies a plate 13 seated on the inclined upper edges of the wall portions 4'. A flange 14 on plate 13 overlies the wall 7 and is secured thereto by means of the fastening 15. An arcuate strip 16 of angular cross section is secured to the upper edge of wall 4 as a seat for the lower end of the hopper. The wall 12 of the hopper rests on the plate 13 which due to the shape of the walls 4' is inclined substantially in correspondence to the inclination of the wall 12.

The rotary metering member C includes a hub 17 mounted on a vertical shaft 18 extending upwardly through the center of the chamber B from the motor F, which hub is provided as here shown with four radial blades 19. These blades form in the chamber B a plurality of metering compartments into which the popped corn will be directed from the hopper with the exception of the compartment formed between the blades which lie under the flat wall portion 12 of the hopper and extend along opposite sides of the opening 9 in the plate 8. In this connection it should be noted that the opening 9 is covered by the wall portion 12 of the hopper to prevent any appreciable amount of popped corn from being discharged therethrough from the hopper while popped corn is being discharged into three of the four compartments provided by the four blades as here shown, the fourth compartment being in discharging position over the opening 9 and under the plate 13 and wall portion 12.

To assure gravitational feed of corn from the hopper into the chamber B the shaft 18 is extended into the hopper and provided with a bladed agitator 20 which revolves in the bulk of pop corn in the hopper.

The blades are spaced above the plate 8 or bottom of the chamber B about the same extent as the ends of the blades are spaced inwardly from the inner face of the cylindrical wall 4. This spacing is such that clogging of the mechanism is prevented and an accurate metering action is assured. Another critical spacing is between the upper edges of the blades and the lower edge 12' of the flat wall portion 12 of the hopper, this spacing being such that it is sufficient to prevent wedging of particles of corn between the blade edges and the surfaces or edges opposed thereto yet is not so great as to readily pass appreciable amounts of corn therethrough and thus interfere with proper metering of the pop corn per each operation of the machine.

The hood D prevents the corn from spilling upward and outward past the margins of the opening 9 and confines the flow of discharging corn from the member C to a path leading directly downward into the chute E. As the corn must flow outwardly from between the blades 19 which are in discharging position, the hood D is of necessity quite large to afford space for the downwardly guided discharge of corn into the chute E. In having the walls 41 elevated and inclined and the walls 6 higher than the wall portion 4, adequate discharge space is provided in the hood and at the same time an inclined support is provided for the wall portion 12 of the hopper. The lower edge 12' of the wall portion 12 extends downwardly to a point close to the axis of the member C and leaves but a small space between it and said axis. No appreciable amount of popcorn will gravitate through this space yet the spacing will prevent clogging as it will allow the metered amount of corn to pass freely under the edge 12' when the blades 19 pass under said edge.

An electric heating element H may be applied around a part of the chamber B to keep the popped corn hot.

When the motor G is operated responsive to coin control mechanism (not shown) in the usual manner common to vending machines the shaft will turn the blades 19 so that one of the three filled compartments between the blades disposed to receive popped corn will be brought into position to discharge the corn through openings 5 and 9 into the delivery chute. Due to the arrangement of the hopper and the chamber B, the corn will fill the chamber as the blades are turned, the agitator in the hopper being also turned assuring gravitational feed into the chamber. The critical spacing of the margins of the metering blades from adjacent surfaces assures a free movement of the blades without clogging, yet the construction of the parts of the unit prevents erratic measuring of the corn and confines it to prescribed paths of movement from the time the corn leaves the hopper until it is discharged in the delivery chute.

While I have shown and described a specific embodiment of my invention, I do not limit myself to the exact details of construction set forth, and the invention embraces such changes, modifications and equivalents of the parts and their formation and arrangement as come within the purview of the appended claims.

I claim:

1. In a metering and dispensing unit for a popped corn vending machine, a casting providing an upright substantially cylindrical wall having an outlet opening on one side thereof extending throughout the height thereof, said wall being of substantially uniform height for about one-half its circumference, the remainder of said wall increasing in height up to the said outlet opening and having upper edges sloping downwardly toward the points of juncture thereof with the wall portion of the uniform height, opposed side walls projecting laterally outward from the marginal portions of said cylindrical wall which define the said outlet opening, an outer wall joined to the side walls and being curved outwardly and downwardly to form therewith a hood contiguous with and extending forwardly of said outlet opening in spaced relation thereto, a hopper mounted to discharge popped corn only into the space defined by the portion of the cylindrical wall which is of substantially uniform height, a horizontal plate on which said cylindrical wall is mounted for forming therewith a metering chamber, said plate having a discharge opening therein registering with the portion of the chamber under said hood and adjacent said outlet opening in said cylindrical wall, and a rotary bladed metering member mounted in said chamber on an axis concentric with said cylindrical wall having radial blades arranged to discharge metered amounts of pop corn outwardly through said outlet opening and downwardly through said discharge opening on rotation of said metering member.

2. In a metering and dispensing unit for a popped corn vending machine, a casting providing an upright substantially cylindrical wall having an outlet opening on the side thereof extending throughout the height thereof, said wall being of substantially uniform height for about one-half its circumference, the remainder of said wall increasing in height up to the said outlet opening and having upper edges sloping downwardly toward the points of juncture thereof with the wall portion of the uniform height, opposed side walls projecting laterally outward from the marginal portions of said cylindrical wall which define the said outlet opening, an outer wall joined to the side walls and being curved outwardly and downwardly to form therewith a hood contiguous with and extending forwardly of said outlet opening in spaced relation thereto, a hopper mounted to discharge popped corn only into the space defined by the portion of the cylindrical wall which is of substantially uniform height, a horizontal plate on which said cylindrical wall is mounted for forming therewith a metering chamber, said plate having a discharge opening therein registering with the portion of the chamber under said hood and adjacent said outlet opening in said cylindrical wall, and a rotary metering member mounted in said chamber on an axis concentric with said cylindrical wall, said metering member having a series of radial blades spaced apart at their outer ends forming outwardly opening compartments therebetween, said metering members being arranged with at least one of said compartments positioned to receive pop corn from said hopper and with another of said compartments opening between adjacent of said blades and between the outer ends thereof to said outlet and discharge opening.

3. In a metering and dispensing unit for a popped corn vending machine, a casting providing an upright substantially cylindrical wall having an outlet opening on one side thereof, said wall being of substantially uniform height for about one-half its circumference, the remainder of said wall increasing in height up to the said outlet opening and having upper edges sloping downwardly toward the points of juncture thereof with the wall portion of the uniform height, opposed side walls projecting laterally outward from the marginal portions of said cylindrical wall which define the said outlet opening, an outer wall joined to the side walls and being curved outwardly and downwardly to form therewith a hood contiguous with and extending forwardly of said outlet opening in said spaced relation thereto, a hopper mounted to discharge popped corn only into the space defined by the portion of the cylindrical wall which is of substantially uniform height, a horizontal plate on which said cylindrical wall is mounted for forming therewith a metering chamber, said plate having a discharge opening therein registering with the portion of the chamber under said hood and adjacent said outlet opening in said cylindrical wall, and a rotary bladed metering member mounted in said chamber on an axis concentric with said cylindrical wall for discharging metered amounts of pop corn through said openings; said bladed member including a plurality of equi-spaced radial blades having upper and lower margins and outer end margins, with the end margins of adjacent blades spaced apart; there being a space between the upper margins of said blades and the hopper, a space between the lower margins of said blade and said horizontal wall, and a space between the end margins of said blades and said cylindrical wall, said spaces being of a size to prevent popped corn from accumulating therein and yet prevent ready passage of popped corn therethrough during movement of the blades.

4. In a metering and dispensing unit for a vending machine, an upright cylindrical metering chamber for the product to be dispensed including a bottom wall having a discharge opening adjacent a margin thereof and a cylindrical wall having an outer opening leading upwardly from the lower end thereof and extending across and connecting with said discharge opening; a hood projecting over said outlet and discharge opening including a top wall which curves outwardly and downwardly in spaced relation to said openings from an upper margin of said cylindrical wall to substantially the plane of said discharge opening, a delivery chute into which the product to be dispensed is discharged through said discharge opening, a rotary bladed metering member operating in said chambers to move metered amounts of the product into position to discharge through said openings into said chute, and a hopper positioned to discharge the product only into the half of said chamber farthest removed from said openings.

FRANK P. EMERSON.

REFERENCES CITED

The following references are of record in the file of this patent:

UNITED STATES PATENTS

| Number | Name | Date |
|---|---|---|
| 930,736 | Davis | Aug. 10, 1909 |
| 987,211 | Bender et al. | Mar. 21, 1911 |
| 1,204,111 | Anderson | Nov. 7, 1916 |
| 1,639,370 | Flegel | Aug. 16, 1927 |
| 1,673,155 | Nielsen | June 12, 1928 |
| 1,966,326 | Wentorf | July 10, 1934 |
| 2,201,655 | Srolduski | May 21, 1940 |

FOREIGN PATENTS

| Number | Country | Date |
|---|---|---|
| 27,671 of 1909 | Great Britain | Jan. 27, 1910 |